Nov. 30, 1971  M. WILCZYNSKI  3,623,189
SELF-LOCKING CLIP FOR SUPPORTING AN ARTICLE
ON A BELT OR OTHER SUPPORT
Filed Nov. 24, 1970
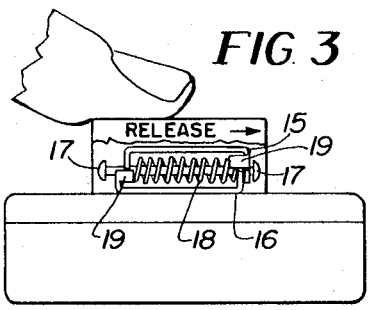
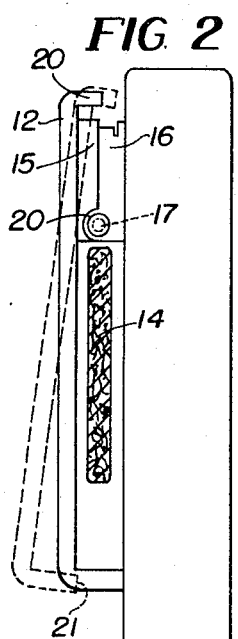
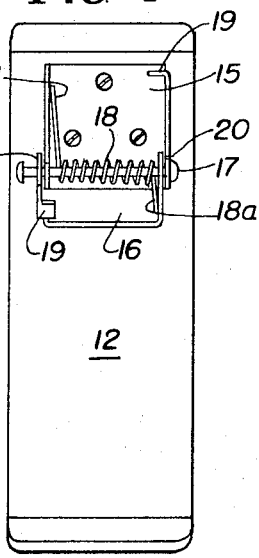
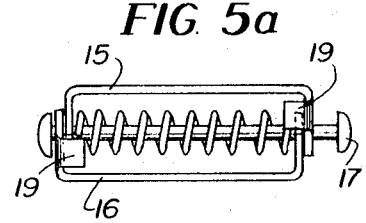
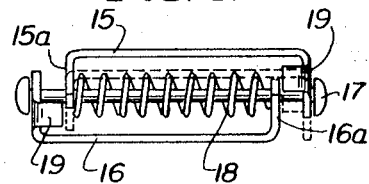
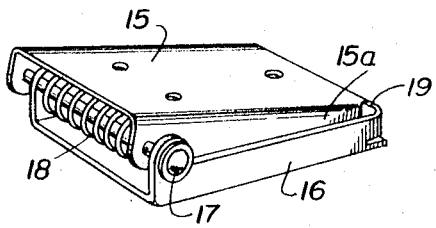
Inventor
MIECZYSLAW WILCZYNSKI
BY Mueller + Aichele
ATTYS.

United States Patent Office 3,623,189
Patented Nov. 30, 1971

3,623,189
SELF-LOCKING CLIP FOR SUPPORTING AN
ARTICLE ON A BELT OR OTHER SUPPORT
Mieczyslaw Wilczynski, Westchester, Ill., assignor to
Motorola, Inc., Franklin Park, Ill.
Filed Nov. 24, 1970, Ser. No. 92,351
Int. Cl. A44b 21/00
U.S. Cl. 24—3 F
8 Claims

ABSTRACT OF THE DISCLOSURE

Self-locking belt clip for miniature radio pager or other device, for supporting the same on a belt or pocket of the user, or on another support. The clip is secured to the device by a pair of brackets connected to each other by a pivot rod, with a spring about the pivot rod holding the brackets in position so that the clip is closed against the device. The brackets have locking tabs which engage the other bracket to lock the clip and prevent opening thereof. The lock is released by moving the clip so that one bracket is moved axially along the pivot rod and the locking tabs clear the other bracket and permit the clip to be opened. The same spring which holds the clip closed also holds the two brackets in the axial position which locks the clip.

BACKGROUND OF THE INVENTION

It is common practice to provide a clip on miniature radio receivers, such as paging receivers, so that the receiver can be clipped onto the belt or in the pocket of the wearer, or clipped on another support. Such clips are spring biased in closed position and provide some resistance to accidental removal from the support. However, when worn on the belt as by a police officer, guard, fireman, etc., the paging receiver or other device may be brushed against an object causing the clip to release and the article to drop and thereby be damaged. Inasmuch as the device involved may be quite expensive, this can result in a substantial loss. Although it is desired to provide a support that will prevent accidental disengagement and dropping of the radio or other device, it is at the same time necessary that the clip be operable for easy and quick removal of the device.

SUMMARY OF THE INVENTION

It is an object of the present invention to provide a clip for securing a small radio receiver or other device to the belt or another part of the clothing of the user, and which locks automatically when applied.

A further object of the invention is to provide a self-locking belt clip which can be easily unlocked and opened by a simple motion.

A still further object of the invention is to provide a self-locking belt clip which is of simple and inexpensive construction and which utilizes a minimum of parts.

In accordance with this invention, a self-locking clip is provided wherein the clip is mounted to a device on which it is used by a pair of brackets pivotally connected to each other. A spring about the pivot rod cooperates with the brackets to hold the clip in closed position. The brackets have locking tabs which engage the other bracket to prevent movement thereof to lock the clip in closed position. One bracket can be moved with respect to the other along the pivot rod so that each locking tab is clear of the other bracket to permit the clip to be opened. The same spring which holds the clip closed also holds the brackets in the locked position to prevent unintentional opening thereof. The top of the clip can be engaged to slide the one bracket to the clear position for unlocking the clip and to open the clip, by a simple continuous motion, so that release of the clip can be easily and quickly accomplished.

BRIEF DESCRIPTION OF THE DRAWINGS

FIG. 1 illustrates the clip in use holding a device on the belt of a user;

FIG. 2 is a side view of the clip and device, with the belt in cross-section;

FIG. 3 is a top view showing the supporting bracket assembly for the clip;

FIG. 4 illustrates the bracket assembly in open position;

FIGS. 5a and 5b illustrate the positions of the brackets for locking and release action; and FIG. 6 is a perspective view of the bracket assembly with the lock released.

DESCRIPTION OF THE PREFERRED EMBODIMENT

In FIG. 1 there is shown the self-locking clip of the invention supporting a radio pager on the belt of a wearer, with the pager being designated 10, the clip 12 and the belt 14. FIG. 2 shows the structure in more detail and shows brackets 15 and 16 connected by pivot rod 17. The clip 12 is secured to the bracket 15, as by screws, and the bracket 16 is secured to the radio device 10 in any suitable way. By depressing the top or mounting end 20 of the clip, the lower or engaging end 21 will move away from the radio device as shown by the dotted lines. This will open the clip so that it can be placed over the belt 14 to support a device thereon, or removed therefrom to remove the device.

FIG. 3 is a top view showing the brackets 15 and 16, the pivot rod 17, and the spring 18 about the pivot rod. FIG. 4 shows the brackets pivoted open, as is possible when the bracket 16 is removed from the device 10. This also shows the ends 18a of the spring 18 bearing against the brackets 15 and 16. The spring 18 tends to hold the brackets in a pivoted position for holding the clip closed, as shown by the solid lines in FIG. 2. As shown in FIGS. 3 and 4, each bracket has a base plate for securing the same to the clip or ot the radio device, and upturned sides each having an enlarged portion 20 (FIG. 4) at one end with an opening therethrough for receiving the pivot rod 17. The two brackets can be of the same configuration, and are positioned with the sides directed toward each other. FIGS. 3 and 4 also illustrate the locking tabs 19 provided on the brackets 15 and 16. These are formed by bending over one end of one upturned side of each bracket, as best shown in FIG. 4.

FIGS. 5a and 5b illustrate the locking and releasing action of the brackets 15 and 16. As shown in FIG. 5a, each locking tab 19 is positioned to engage the upturned side of the opposite bracket. The tabs on the two brackets 15 and 16 provide stops on both sides of the bracket assembly. This prevents the brackets from pivoting together and acts to lock the clip in closed position. Pivot rod 17 is longer than the brackets and permits the bracket 15 to be slid axially along the rod to the position shown in FIG. 5b. In this position, each locking tab 19 is clear of the upturned side of the opposite bracket, so that the brackets can be pivoted to a position to open the clip. The pivoted open position is shown by dotted lines in FIG. 5b. FIG. 6 also shows the brackets moved to the position to open the clip, after the lock has been released as has been described.

It is apparent from FIG. 5b that the spring 18 will be compressed between the upturned edge 15a of bracket 15 and the upturned edge 16a of bracket 16 when the bracket 15 is slid to the right, as shown in FIG. 5b. The spring 18 will act as a compression spring to return the bracket 15 to the locking position shown in FIG. 5a, as soon as the bracket 15 is released. Accordingly, the same spring 18 acts to hold the brackets in a position to hold the clip closed, and also to hold the brackets in the locking position.

The self-locking clip can be easily unlocked and released by moving the clip to the right, as shown in FIGS. 3 and 5a, to move the locking tabs clear of the opposite bracket, and the clip can be pivoted at the same time to open the same. FIG. 3 shows how this can be done by the use of a thumb of a person on the top of the clip. This also shows that the top of the clip can have a marking thereon to indicate the direction in which the clip must be moved to release the lock.

The self-locking clip structure has been found to be highly effective in tests which have been made. The structure is extremely simple as the two brackets used are identical and a single spring provides bias to hold the brackets in the axial position to lock the clip and in the pivoted position to hold the clip closed.

I claim:

1. A locking clip structure for fastening an article to a belt or the like, including in combination, an elongated clip having a mounting end and an engaging end, means for securing said clip to the article including a first bracket secured to said clip at said mounting end thereof and a second bracket adapted to be secured to the article, pivot means including a pivot rod cooperating with said first and second brackets to provide a pivotal connection therebetween, and spring means biasing said brackets to a position such that said engaging end of said clip tends to close against the article, said brackets having portions constructed to engage each other to limit movement therebetween against the spring bias to thereby lock said engaging end of said clip in a closed position against the article, said pivot rod being constructed to allow one of said brackets to slide axailly therealong so that said portions of said brackets are clear of each other whereby greater movement between said brackets is permitted and said engaging end of said clip can be moved to an open position away from the article.

2. The clip structure of claim 1 wherein said spring means includes a coil spring about said pivot rod which biases said brackets to position the same to lock said clip.

3. The clip structure of claim 1 wherein said first and second brackets are of the same configuration.

4. The clip structure of claim 1 wherein each bracket has a base portion with upturned sides, and each side has an enlarged portion at one end thereof with an opening therein for receiving said pivot rod.

5. The clip structure of claim 4 wherein one side of each bracket has a bent portion at the end thereof opposite said enlarged portion which acts as a locking tab.

6. The clip structure of claim 5 wherein the locking tab of each bracket is positioned to engage one side of the other bracket when said brackets are positioned to lock said clip.

7. The clip structure of claim 6 wherein said pivot rod is longer than the spacing between said sides of said brackets to allow one of said brackets to slide along said pivot rod to a position such that each of said locking tabs is movable in a path clear of said one side of the other bracket to permit pivotal movement of said brackets to open said clip.

8. The clip structure of claim 7 wherein said spring means includes a coil spring having first and second ends engaging said first and second brackets respectively, said coil spring tending to hold the brackets in positions so that said clip is closed and is locked.

References Cited

UNITED STATES PATENTS

| | | | |
|---|---|---|---|
| 547,846 | 10/1895 | Carpenter | 24—253 X |
| 2,397,780 | 4/1946 | Emde | 24—3 F |

FOREIGN PATENTS

| | | | |
|---|---|---|---|
| 610,847 | 6/1926 | France | 24—253 |

DONALD A. GRIFFIN, Primary Examiner

U.S. Cl. X.R.

24—253